United States Patent
Guggenheim, Jr. et al.

(10) Patent No.: US 7,490,756 B1
(45) Date of Patent: Feb. 17, 2009

(54) METHOD FOR ISSUING AN INVITATION TO A SHOW

(75) Inventors: Alvin S. Guggenheim, Jr., Houston, TX (US); Alvin S. Guggenheim, III, Houston, TX (US); Hildred C. Guggenheim, Houston, TX (US)

(73) Assignee: Entertainment Printing Services, LP, Houston, TX (US)

( * ) Notice: Subject to any disclaimer, the term of this patent is extended or adjusted under 35 U.S.C. 154(b) by 0 days.

(21) Appl. No.: 11/510,069

(22) Filed: Aug. 25, 2006

(51) Int. Cl.
*G06F 17/00* (2006.01)

(52) U.S. Cl. ...................... 235/375; 235/385

(58) Field of Classification Search ................. 235/375, 235/380, 382, 385, 462.01, 462.45, 472
See application file for complete search history.

(56) References Cited

U.S. PATENT DOCUMENTS

| | | | | |
|---|---|---|---|---|
| 6,959,286 B2 * | 10/2005 | Perkowski | ................... | 705/27 |
| 7,024,016 B2 * | 4/2006 | Rhoads et al. | .............. | 382/100 |
| 7,089,199 B2 * | 8/2006 | Perkowski | ................... | 705/27 |
| 7,164,780 B2 * | 1/2007 | Brundage et al. | ........... | 382/100 |
| 2002/0154157 A1 * | 10/2002 | Sherr et al. | ................. | 345/716 |
| 2004/0059643 A1 * | 3/2004 | Marti | ........................ | 705/26 |
| 2006/0143191 A1 * | 6/2006 | Cho et al. | ................... | 707/100 |
| 2006/0174274 A1 * | 8/2006 | Vance et al. | .................. | 725/45 |
| 2007/0168485 A1 * | 7/2007 | DuFour | ...................... | 709/223 |

* cited by examiner

*Primary Examiner*—Daniel St. Cyr
(74) *Attorney, Agent, or Firm*—Buskop Law Group, PC; Wendy Buskop

(57) ABSTRACT

A method of issuing an invitation to a show at a movie theater wherein information can be compiled on a database on a database server. The method forms a website comprising computer instructions to generate at least one ticket by a user using the database. The method additionally uses an invitation server and prints a ticket for the user. The bar code is read at the show and the bar code information is transmitted to a report server where it is complied.

16 Claims, 5 Drawing Sheets

METHOD FOR ISSUING AN INVITATION TO A SHOW

FIELD

The present embodiments relate generally to obtaining results concerning a theatrical performance.

BACKGROUND

This invention relates generally to an electronic system for facilitating the selection of persons to a screening of a movie or other theatrical event using a bar code scanner for evaluation of various programs including movies.

Movie studios have difficulty in obtaining the right audience to prescreen a movie for release. Typically they hire a promotions house that hires a printer to print large quantities of passes that are given away at strategically located bookstores and other locations to attract the correct clientele to the screening.

Often the wrong theater goers end up at the theater or not enough people end up at the theater and the feedback is too thin to be usable by the studios.

A need has existed for studios to reach targeted audiences, cheaply, effectively and on short notice.

Studios rely on demographic data from screenings to decide how they will promote a movie. Currently the tickets that the studios use are open to counterfeiting or other unauthorized duplication. This skews the carefully planned screenings demographics.

The present embodiments meet these needs.

BRIEF DESCRIPTION OF THE DRAWINGS

The detailed description will be better understood in conjunction with the accompanying drawings as follows.

Figure 1:
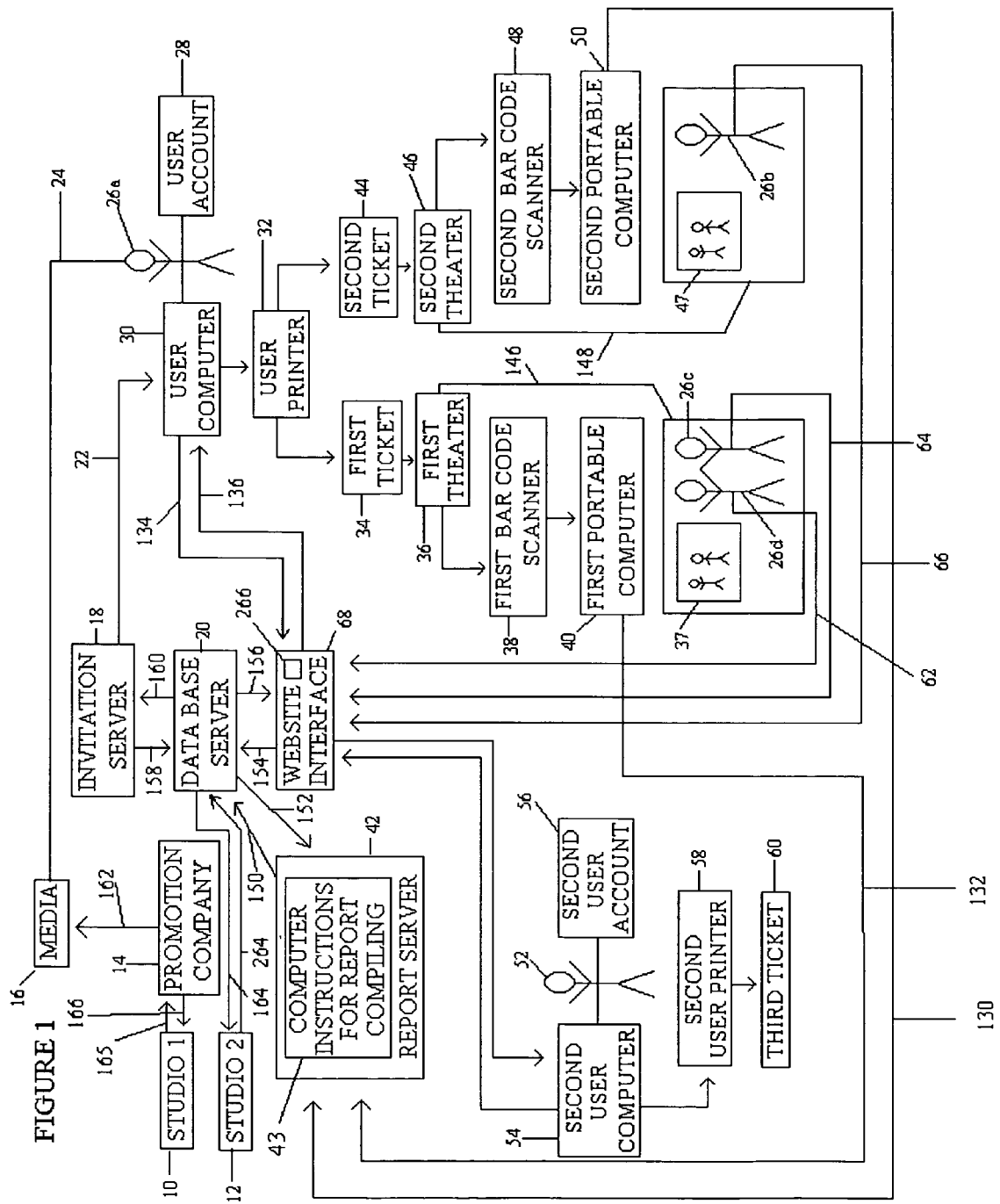
FIG. 1 is a diagram of the system of the invention.

The present embodiments are detailed below with reference to the listed Figures.

DETAILED DESCRIPTION OF THE EMBODIMENTS

Before explaining the present embodiments in detail, it is to be understood that the embodiments are not limited to the particular embodiments and that they can be practiced or carried out in various ways.

The invention relates to a method for issuing an invitation and tickets to a show at a theater, such as a movie theater.

The invention solves the need for one or more production companies, such as movie studios, to access a database server to send out and track invitations to theatrical events at non-related theater venues, such as movie houses.

Referring now to the drawings, in which like numerals represent like elements throughout the several figures, aspects of the present invention and the preferred operating environment will be described.

FIG. 1 illustrates various aspects of an exemplary computing environment in which the present invention is designed to operate. Those skilled in the art will appreciate that FIG. 1 and the associated discussion are intended to provide a brief, general description of the preferred program modules.

The invention contemplates that one or more production companies, noted as studio 1 identified as element 10 and studio 2, identified as element 12 can communicate with a database server 20 for promotion of their productions. The Studio 1 and Studio 2 can be movie theaters or movie distribution companies.

In FIG. 1, it is depicted a promotion company 14, for coordinating information 165 from studio 1 shown as element 10 and advising studio 1 through information from the production company 166.

The promotion company 14 may be instructed to advise media 16, which can be radio media, television media, satellite radio media, an internet news blog or print media through a message 162 that studio 1 has a new hit movie that it desires to screen to a population within the geographic range of the radio station, television station, or other broadcast media.

Alternatively, in this invention, a studio 12, like Studio 2, can bypass the promotion company and directly insert data into a database server 20 through an input 264 and gain reporting data 165 back from the database server 20.

Figure 4:
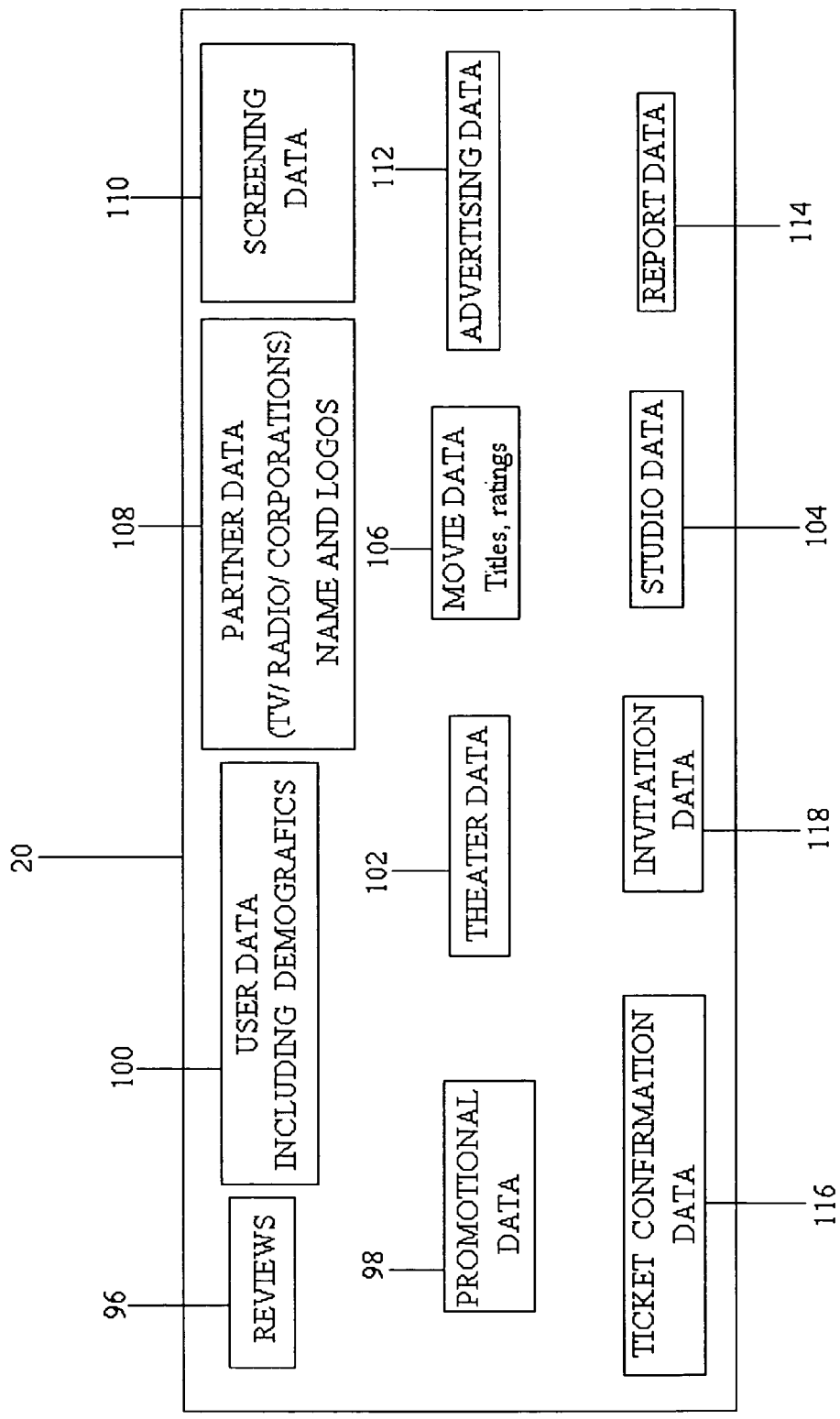
FIG. 4 depicts a graphical user interface of the database server and the instructions contained therein.

The database server has numerous types of computer instructions resident on the database server, these computer instructions as well as various pieces of data shown in FIG. 4.

The database server 20 also communicates in a two way communication 158, 160 with an invitation server 18. The invitation server is described more fully in FIG. 5

For example, if a movie production house, like Paramount, wanted to screen a new movie called "Little Guggenheim", then the invitation server would do the following: Determine that "Little Guggenheim" needs invitations sent by retrieving data from element 110 at some time interval. Then the targeted demographics for the screening are also obtained from element 110. Next user data 100 is continuously searched until enough users are selected to be sent invitations as determined by set quotas, based on the demographic directives from Paramount, or until all users have been examined. After said users are selected, a unique invitation is generated for each user. After that each user will receive a notification of their invitation through e-mail. Finally at some time interval the invitation server will check invitation data 118, comparing the number of confirmed invitations to the set quota stored in 110. If said quota has not been met, then all of these steps will be repeated until said quota is met or until the day of the screening.

The invitation server 18, emails an invitation to at least one user computer 30 of a user 26a that has a user account 28. The user 26a can read the email 22, and then log into the website interface 68 using a signal 134. Using the website, the user can receive a ticket code via a message 136. The message 136 permits the user 26a to print a first ticket 34 on his user printer 32 for attending a show at a first theater 36. Alternatively, the user 26a could have heard an ad 24 which provided the code over a broadcast, such as a radio show. The user could print a second ticket 44 to a different show at a second theater 46.

Figure 2:
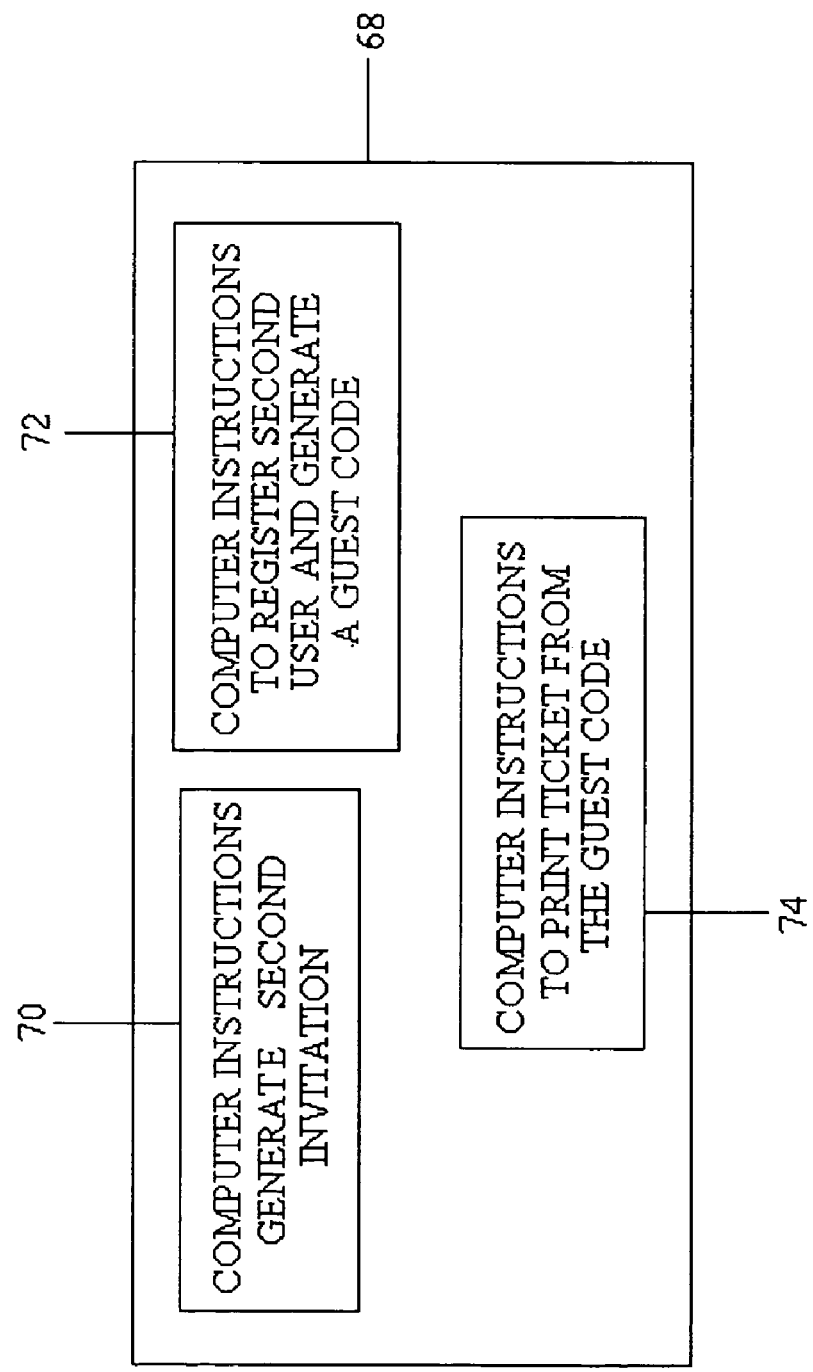
FIG. 2 is a graphical user interface of the website server.

The website interface 68, as shown in FIG. 2 has several elements, including computer instructions to generate a second invitation 70, computer instructions to register a second user and generate a guest code 72, and computer instructions to print a ticket using the guest code 74.

For example this guest code printing would work as follows: Dan wants to invite Jane to the movies. Dan simply loges in to the website 68 and confirms his ticket. During that process he will be presented with several options on how he would like his guest to be notified that she can now retrieve a ticket. Dan instructs the website to make a printable invitation for his guest. The website will then generate an invitation that Dan can print using his printer 32. Finally Dan gives the invitation that he printed to Jane.

Figure 3:
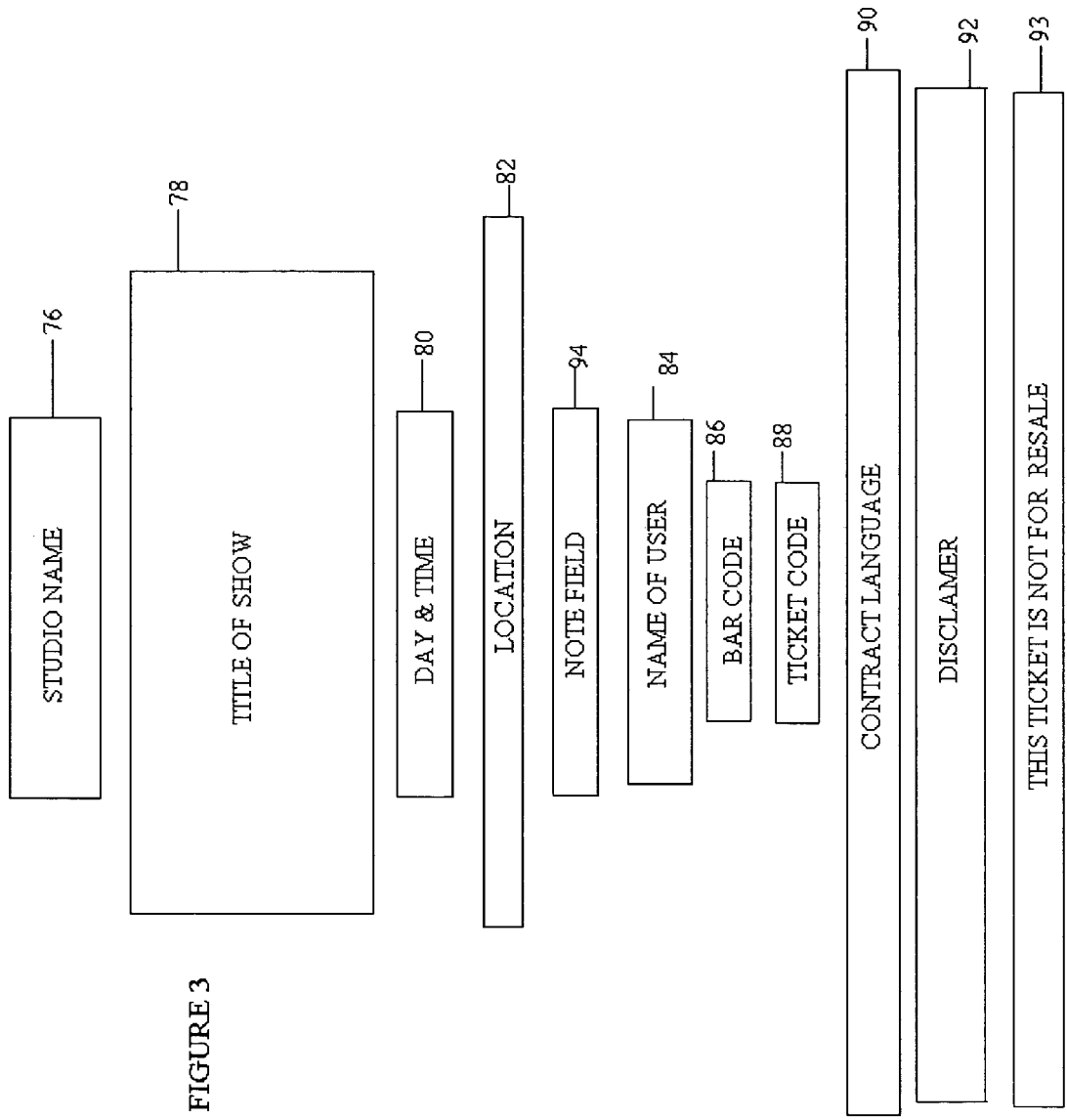
FIG. 3 depicts a ticket printed according to this system.

The printed ticket, printed by the user would have several elements on it as shown in FIG. 3. Specifically the ticket might have the studio name 76 such as New Line, the title of the show 78, such as The Lord of the Rings, The Return of the King (the movie title), a day and time of the show 80 such as Aug. 31, 2006 at 7:30 PM, a location of the show 82 such as Cinemark at Town and Country, a note field for customization 94, such as "Wear a costume to the screening and receive a special prize", the name of the user 84, such as John Doe, a bar code 86, a ticket code 88, such as 5ac6fe3b1, contact language 90, such as "This screening will be monitored for unauthorized recording. By attending, you agree not to bring any audio or video recording device into the theatre (audio recording devices for credentialed press excepted) and consent to a physical search of your belongings and person. Any attempted use of recording devices will result in immediate removal from the theatre, forfeiture, and may subject you to criminal and civil liability. Please allow additional time for heightened security. You can assist us by leaving all non-essential bags at home or in your vehicle. New Line thanks you for your cooperation.", a disclaimer 92, such as "Theatre is overbooked to ensure a full house. Arrive early! Seating is first come first served, EXCEPT FOR MEMBERS OF THE REVIEWING PRESS. This pass does not guarantee admission and must be surrendered upon demand. No one will be admitted without a ticket or after the screening begins. Theater is not responsible for overbooking. Infants are strongly discouraged. This pass is the property of New Line who reserves the right to refuse, revoke, or limit admission at the discretion of an authorized studio and/or theatre representative at any time." and a "not for resale statement" 93.

The user takes the first ticket 34 and or second ticket 44 to the first and second theaters respectively noted as elements 36, and 46, where the tickets are bar scanned with a first bar code scanner 38 and a second bar code scanner 148. The bar code scanners store their data either wirelessly or using a wired connection to a first and second portable computer respectively, see elements 40, and 50.

By reading the bar code, access to the show is controlled so that only selected users can attend.

The first and second portable computers transmit the bar code data 130, 132 to a report server 42 for comparing the transmitted bar code data with user data, compiling the bar code data 43 and transmitting the compared bar code data to the database using transmission 150, with a response 152.

The user then attends the show. One or more users 26c, 26d can attend a show 37 or a single user 26b, can attend a second show 47.

Prior to attending the show, the users receive a communication from the invitation server or media and a code to use on the website, that enables the user to review the show. After viewing a show, the user(s) provides a review, 62, 64, 66 via the website interface 68 on the shows. The reviews are stored on the database server 20 for viewing by a studio, a promotions company or both.

It is contemplated that the first user can print tickets to two different screenings. It is also contemplated that a second user 52 can log onto the website interface 68, and obtain a second user account 56 to print a third user ticket 60 with a second user printer 58 via a second user computer 54.

It should be noted in one embodiment, the invitation server, and website are formed and controlled by a third party contactor.

User data can be input by the user.

Advertising data, movie data and studio data can be input by a third party contractor.

Screening data, report data, promotion company data, partner data, theater data, is input by a promotion company.

Invitation data is input by a promotion company, a third party contractor or a user such as Jack Johnson.

In addition to reading the bar code at the show, the name of the user could be read and verified against photo identification.

The bar codes are read by a bar code scanner, the scanner communicates with a portable computer that compiles the scanned bar codes and the portable computer communicates with the report server the compiled scanned bar codes.

A report is generated containing all demographics, user data, reviews, screening data, related to movies identified in the movies data, by theater.

More specifically, a user communicates with the website that the user desires to bring a second user to the screening, the website then transmits an invitation with invitation code to the second user, the second user then communicates with the website, creates a second user account, obtains a second ticket code for the first show, prints a second ticket and attends the first show after the second ticket is bar code scanned and provides a review via the website.

The user data can include data on movie critics that attend any one screening.

FIG. 4 shows the database server 20 contains reviews on the productions 96, such as "This movie was the best of the trilogy!" promotional data 98, such as target demographics, 10% of the audience should be Latino user data including individual demographics 100, such as Caucasian male age 34, theater data 102, such as the name of the theater Edwards Grand Palace, studio data 104 such as Warner Bros and their logo artwork, movie data 106 such as Spiderman and its artwork, invitation data 118 such as invitation codes, which screening the invitation is for, whether or not it is an invitation for a guest, whether or not the invitation guarantees its holder a ticket, data to specify if the invitation has been confirmed; partner data, such as television station data, radio station data, corporation data names and logos 108 such as 94.5 KTBZ—The Buzz, screening data 110, such as Location Information, Date and Time of the screening, Number of seats in the theatre, Overbooking information, what movie will be screened advertising data 112 such as the client name, the actual ad artwork, number of times that ad has been shown and/or clicked and report data 114, such as a report on the number of people who actually attended broken down demographically, press in attendance, any problems that arose during the movie, number of people turned away, screening identification information (time, date, location, movie name). ticket confirmation data 116 such as ticket number, the screening it is valid for admittance to, any guest invitations associated with a particular ticket, invitation code that was confirmed to obtain the ticket.

The database server 20 has two-way communications 154 and 156 with a website interface 68 which has computer instructions to generate at least one ticket by a user using the database 266.

Figure 5:
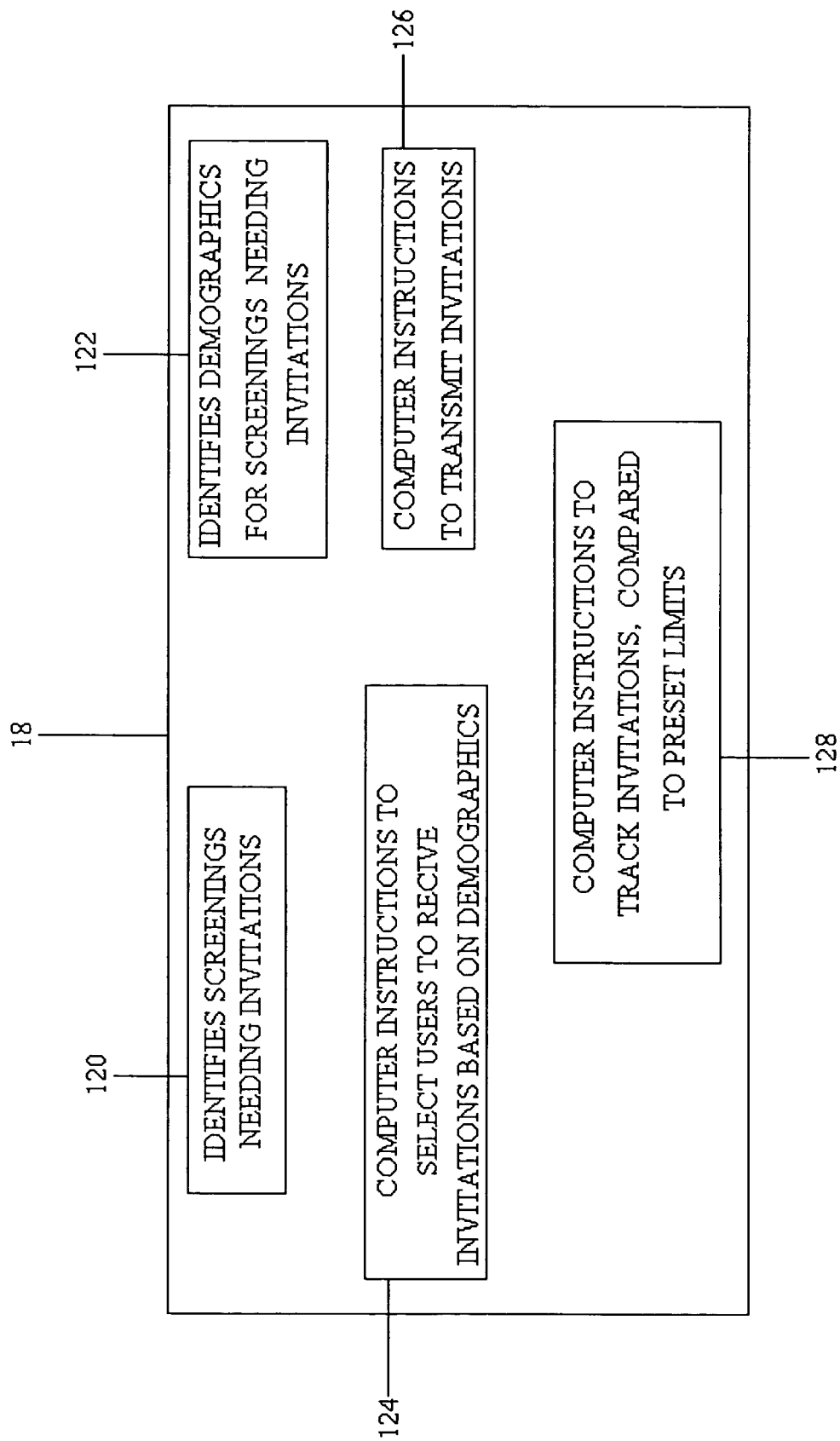
FIG. 5 depicts a diagram of an invitation server usable herein.

FIG. 5 shows that the invitation server has computer instructions instructing the processor to identify screenings, such as a screening on Aug. 23, 2006 from screening data that indicates 122 invitations are needed, computer instructions to identify demographics for screenings needing invitations from user data 122, selecting users to receive invitations using identified demographics and user data 124; forming an invitation using invitation data having an individuation code and transmitting the invitations using theater data, and event data 126 to at least one user and then tracking the invitations against preset limits 128.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of issuing an invitation to a show at a movie theater wherein compiling a database on a database server comprises the steps of:

forming a website comprising computer instructions to generate at least one ticket by a user using the database;

using an invitation server comprising: computer instructions instructing the processor to identify screenings from screening data, identify demographics for screening from user data, selecting users to receive invitations using identified demographics and user data, forming an invitation using invitation data having an individuation code, theater data, and movie data, transmitting the formed invitation to at least one user;

printing a ticket by the user comprising a name of the user, a bar code, a ticket code, title of show, date and time of show, location of show, a not for resale statement;

reading the bar code at the show to control access to the show only to selected users;

transmitting the bar code to a report server for comparing the transmitted bar code data with user data;

compiling the bar code data and transmitting the compared bar code data to the database; and after viewing the show, the user provides a review on the show via the website, wherein the review is stored on a database server for viewing by a studio, a promotions company, or both.

2. The method of claim 1 wherein the database further comprises a member of the group consisting of: studio data, promotion company data, partner data, advertising data, report data or combinations thereof.

3. The method of claim 2, wherein advertising data, movie data and studio data is input by a third party contractor.

4. The method of claim 2, wherein screening data, report data, promotion company data, partner data, theater data, is input by a promotion company.

5. The method of claim 1, wherein the database comprises of invitation data, user data, theater data, screening data, movie data, ticket confirmation data and review data.

6. The method of claim 1, wherein the website further comprises computer instructions to generate a second user invitation, to register a second user, to generate a second user guest code, and to enable the second user to print at least one ticket.

7. The method of claim 1, wherein the invitation server further comprises computer instructions to track invitations compared to a preset limit.

8. The method of claim 1, wherein the ticket further comprises a member of the group consisting of: a studio name, a name of the user, a disclaimer that the theater may be overbooked, contract language, a note field, or combinations thereof.

9. The method of claim 1, wherein the database, invitation server, and website are formed and controlled by a third party contactor.

10. The method of claim 1, wherein user data is input by the user.

11. The method of claim 1, wherein invitation data is input by a promotion company, a third party contractor or a user.

12. The method of claim 1, wherein in addition to reading the bar code at the show the name of the user would be read and verified against photo identification.

13. The method of claim 1, wherein the bar codes are read by a bar code scanner, the scanner communicates with a portable computer that compiles the scanned bar codes and the portable computer communicates with the report server the compiled scanned bar codes.

14. The method of claim 1, wherein a report is generated containing all demographics, user data, reviews, screening data, related to movies identified in the movies data, by theater.

15. The method of claim 1, wherein the user communicates with the website that the user desires to bring a second user to the screening, the website then transmits an invitation with invitation code to the second user, the second user then communicates with the website, creates a second user account, obtains a second ticket code for the first show, prints a second ticket, and attends the first show after the second ticket is bar code scanned and provides a review via the website.

16. The method of claim 1, wherein the user data comprises data on movie critics that attend screening.

* * * * *